(12) United States Patent
Wang

(10) Patent No.: US 10,772,115 B2
(45) Date of Patent: Sep. 8, 2020

(54) RESOURCE SCHEDULING METHOD AND SERVER

(71) Applicant: TENCENT TECHNOLOGY (SHENZHEN) COMPANY LIMITED, Shenzhen (CN)

(72) Inventor: Jia Wang, Shenzhen (CN)

(73) Assignee: TENCENT TECHNOLOGY (SHENZHEN) COMPANY LIMITED, Shenzhen (CN)

(*) Notice: Subject to any disclaimer, the term of this patent is extended or adjusted under 35 U.S.C. 154(b) by 0 days.

(21) Appl. No.: 16/355,091

(22) Filed: Mar. 15, 2019

(65) Prior Publication Data

US 2019/0215846 A1 Jul. 11, 2019

Related U.S. Application Data

(63) Continuation of application No. PCT/CN2017/112522, filed on Nov. 23, 2017.

(30) Foreign Application Priority Data

Dec. 22, 2016 (CN) .......................... 2016 1 1199533

(51) Int. Cl.
*H04W 72/12* (2009.01)
*H04W 28/16* (2009.01)
*G06F 9/50* (2006.01)

(52) U.S. Cl.
CPC .......... *H04W 72/1247* (2013.01); *G06F 9/50* (2013.01); *H04W 28/16* (2013.01);
(Continued)

(58) Field of Classification Search
CPC ............. H04W 72/1247; H04W 28/16; H04W 72/121; H04W 72/1289; H04W 72/1252;
(Continued)

(56) References Cited

U.S. PATENT DOCUMENTS

| 2005/0039183 A1* | 2/2005 | Romero ................ G06F 9/5061 718/100 |
| 2007/0171932 A1 | 7/2007 | Basuthakur et al. |

(Continued)

FOREIGN PATENT DOCUMENTS

| CN | 103188685 A | 7/2013 |
| CN | 104244414 A | 12/2014 |

(Continued)

OTHER PUBLICATIONS

The World Intellectual Property Organization (WIPO) International Search Report and Written Opinion for PCT/CN2017/112522 dated Jan. 22, 2018 5 Pages (including translation).

(Continued)

*Primary Examiner* — Mounir Moutaouakil
(74) *Attorney, Agent, or Firm* — Anova Law Group, PLLC

(57) ABSTRACT

A resource scheduling method is provided. The method includes receiving a resource application request sent by a first terminal, the resource application request including a quantity of required resources of the first terminal and a resource priority level (RPL) requested by the first terminal, and determining a quantity of initially configured resources of the first terminal according to the quantity of required resources. The method also includes performing resource scheduling and re-allocation according to a total quantity of available resources in a scheduling domain, quantities of initially configured resources of all terminals in the scheduling domain, and RPLs of all terminals in the scheduling domain, to obtain a quantity of re-configured resources of the first terminal, and allocating one or more resources to the first terminal according to the quantity of re-configured resources of the first terminal. The first terminal is a terminal in the scheduling domain.

20 Claims, 3 Drawing Sheets

(52) U.S. Cl.
CPC ...... *H04W 72/121* (2013.01); *H04W 72/1252* (2013.01); *H04W 72/1289* (2013.01)

(58) Field of Classification Search
CPC ..... G06F 9/50; G06F 9/5061; H04L 67/1002; H04L 67/32
See application file for complete search history.

(56) References Cited

U.S. PATENT DOCUMENTS

| | | | | |
|---|---|---|---|---|
| 2012/0102497 | A1* | 4/2012 | Stahl | G06F 9/50 718/103 |
| 2017/0295591 | A1* | 10/2017 | Nguyen | H04W 72/1247 |
| 2017/0311167 | A1* | 10/2017 | Sun | H04W 16/10 |
| 2018/0063855 | A1* | 3/2018 | Xu | H04W 72/121 |

FOREIGN PATENT DOCUMENTS

| | | |
|---|---|---|
| CN | 106332088 A | 1/2017 |
| WO | 02069665 A2 | 9/2002 |

OTHER PUBLICATIONS

Frits Hoogland, "Throttling IO with Linux", Frits Hoogland Weblog, Dec. 15, 2012, Retrieved from the Internet: URL: https://fritshoogland.wordpress.com/2012/12/15/throttling-io-with-linux/. 7 Pages.
Chandandeep Singh Pabla, "Completely Fair Scheduler", Linux Journal, Aug. 1, 2009, Retrieved from the Internet: URL: https://www.linuxjournal.com/node/10267. 9 Pages.

* cited by examiner

RESOURCE SCHEDULING METHOD AND SERVER

RELATED APPLICATIONS

This application is a continuation application of PCT Patent Application No. PCT/CN2017/112522, filed on Nov. 23, 2017, which claims priority to Chinese Patent Application No. 201611199533.2, entitled "RESOURCE SCHEDULING METHOD AND SERVER" filed with the Chinese Patent Office on Dec. 22, 2016, which is incorporated herein by reference in its entirety.

FIELD OF TECHNOLOGY

The present disclosure relates to the field of computer technologies and, in particular, to a resource scheduling method and system.

BACKGROUND

A computer can provide various resources such as memory space, magnetic disk space, interface bandwidth, and network bandwidth, etc., and the various resources of the computer may be separately used by terminals of different users.

Currently, a resource scheduling method, quantity-based resource allocation, to be specific, static resource scheduling, exists in the field of resource scheduling. The quantity of resources available for each terminal is defined before scheduling, and a scheduling system completes static resource allocation according to the definition. Only definition update of the terminals causes a change of resource allocation, and the definition update includes adding a new user, user log-out, user expansion or shrinking, and the like. A solution using this scheduling method includes a memory control group (MEMCG), network bandwidth control (Traffic Control, TC), traffic separation, and the like.

Currently, another resource scheduling method, time-based resource allocation, also exists in the field resource scheduling, and the time-based resource allocation belongs to static resource allocation in another form. The time slice length of resources available for each terminal is defined before scheduling, and the terminal exclusively occupies the resources within the time slice. The scheduling system does not consider resource utilization of the terminal within the time slice, but performs resource separation only by limiting corresponding usage time for different terminals. A solution using this scheduling method includes complete fair queue (CFQ), and the like.

In the technical solutions of quantity-based resource allocation, an actual resource use status of the terminal is not considered during an entire scheduling process, and an allocation proportion cannot be adjusted in real time to satisfy a constantly-changing user requirement. In addition, resources of some terminals may be idle, reducing the resource sharing efficiency.

In the technical solutions of time-based resource allocation, the problem of an allocation boundary caused by the difficulty in defining the quantity of required resources in the quantity-based resource allocation solution is resolved, the terminal is allowed to use the resources within a pre-defined time slice. However, an action of exclusively occupying, by a terminal, the resources within a particular time slice also leads to resource waste, and the waste degree is even worse than that of the quantity-based resource allocation solution, and more resources may be idle within some time slices.

SUMMARY

Embodiments of the present disclosure provide a resource scheduling method and server, to improve the resource allocation efficiency and utilization.

One aspect of the present disclosure includes a resource scheduling method. The method includes receiving a resource application request sent by a first terminal, the resource application request including a quantity of required resources of the first terminal and a resource priority level (RPL) requested by the first terminal, and determining a quantity of initially configured resources of the first terminal according to the quantity of required resources. The method also includes performing resource scheduling and re-allocation according to a total quantity of available resources in a scheduling domain, quantities of initially configured resources of all terminals in the scheduling domain, and RPLs of all terminals in the scheduling domain, to obtain a quantity of re-configured resources of the first terminal, and allocating one or more resources to the first terminal according to the quantity of re-configured resources of the first terminal. The first terminal is a terminal in the scheduling domain.

Another aspect of the present disclosure includes a resource scheduling server. The scheduling server includes a memory storing computer program instructions, and a processor coupled to the memory. When executing the computer program instructions, the processor is configured to perform: receiving a resource application request sent by a first terminal, the resource application request including a quantity of required resources of the first terminal and a resource priority level (RPL) requested by the first terminal; determining a quantity of initially configured resources of the first terminal according to the quantity of required resources; performing resource scheduling and re-allocation according to a total quantity of available resources in a scheduling domain, quantities of initially configured resources of all terminals in the scheduling domain, and RPLs of all terminals in the scheduling domain, to obtain a quantity of re-configured resources of the first terminal, the first terminal being a terminal in the scheduling domain; and allocating one or more resources to the first terminal according to the quantity of re-configured resources of the first terminal.

Another aspect of the present disclosure includes a non-transitory computer-readable storage medium. The non-transitory computer-readable storage medium stores computer program instructions executable by at least one processor to perform: receiving a resource application request sent by a first terminal, the resource application request including a quantity of required resources of the first terminal and a resource priority level (RPL) requested by the first terminal; determining a quantity of initially configured resources of the first terminal according to the quantity of required resources; performing resource scheduling and re-allocation according to a total quantity of available resources in a scheduling domain, quantities of initially configured resources of all terminals in the scheduling domain, and RPLs of all terminals in the scheduling domain, to obtain a quantity of re-configured resources of the first terminal, the first terminal being a terminal in the scheduling domain; and allocating one or more resources to the first terminal according to the quantity of re-configured resources of the first terminal.

Other aspects of the present disclosure can be understood by those skilled in the art in light of the description, the claims, and the drawings of the present disclosure.

DETAILED DESCRIPTION

To make the objectives, features, and advantages of the present disclosure clearer and more comprehensible, the following describes the technical solutions in the embodiments of the present disclosure with reference to the accompanying drawings. Apparently, the embodiments described are merely some but not all of the embodiments of the present disclosure. Other embodiments obtained by persons skilled in the art based on the embodiments of the present disclosure shall fall within the protection scope of the present disclosure.

Terms "including", "having", and any variants thereof in the specification, claims, and accompanying drawings of the present disclosure intend to cover non-exclusive inclusion, so that a process, method, system, product, or device including a series of units is not limited to the units, but may include another unit that is no clearly listed or that is inherent to the process, method, product, or device.

In the resource scheduling field, both quantity-based resource allocation and time-based resource allocation belong to static resource allocation and, in the entire scheduling process, resources are insufficiently used, reducing the resource sharing efficiency. In the embodiments of the present disclosure, flexible scheduling based on resource grading can be implemented. The resource requirement allowed to be defined includes a resource priority level (RPL) and a quantity of required resources, thereby satisfying requirements of various types of scheduling scenarios. Definition of the quantity of required resources of a terminal is merely one input in a scheduling process. In the embodiments of the present disclosure, during actual resource scheduling, flexible resource allocation may be performed according to a total quantity of available resources in the entire scheduling domain, in other words, based on the RPLs and quantities of required resources of other terminals at the same time, so that the resource waste problem is resolved and resource requirements of terminals can be satisfied.

Figure 1A:
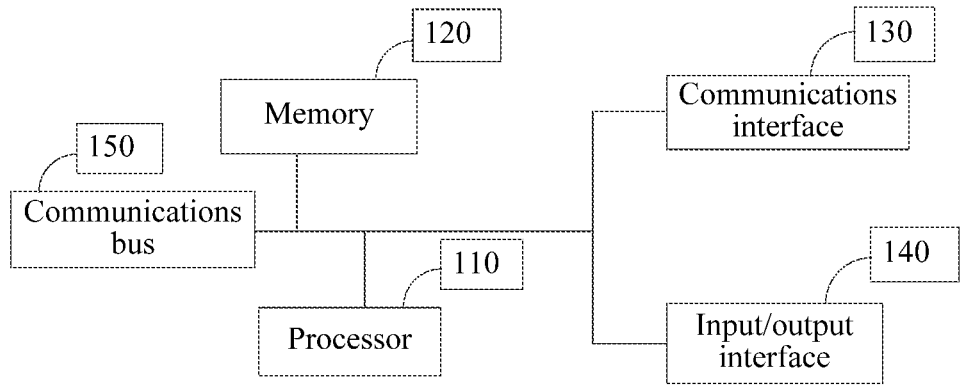
FIG. 1A is a schematic structural diagram of a resource scheduling server according to an embodiment of the present disclosure.

The resource scheduling method provided in the embodiments of the present disclosure is implemented based on a resource scheduling server. Before the resource scheduling method in the present disclosure is described, the resource scheduling server is described first. The server is a processing device having data storage and data processing functions and the like. Referring to FIG. 1A, FIG. 1A is a schematic structural diagram of a resource scheduling server according to an embodiment of the present disclosure. As shown in FIG. 1A, the resource scheduling server may include a processor 110, a memory 120, a communications interface 130, an input/output interface 140, and a communications bus 150.

The processor 110, the memory 120, the communications interface 130, and the input/output interface 140 communicate with each other by using the communications bus 150.

The memory 120 may be configured to store a software program and a module, and the processor 110 runs the software program and the module that are stored in the memory 120, to perform various function applications and data processing of the resource scheduling server. The memory 120 may mainly include a program storage area and a data storage area. The program storage area may store an operating system (OS), at least one application required by the functions, and the like. In addition, the memory 120 may include a high-speed random-access memory (RAM), and may also include a non-volatile memory, such as at least one magnetic disk storage device, a flash memory, or another volatile solid-state storage device. The communications interface 130 may be used by the server to exchange data with an external device. The input/output interface 140 is configured to receive information input by a terminal, for example, a quantity of required resources requested by the terminal and an RPL requested by the terminal; generate key signal input related to user setting and function control of the resource scheduling server; output an allocated resource to the terminal according to processing of a resource input request of the terminal; and generate key signal output related to the user setting and function control of the resource scheduling server.

Specifically, in one embodiment, the processor 110 loads executable files corresponding to processes of the one or more applications to the memory 120 according to the following instructions, and the processor 110 runs the software program stored in the memory 120, to implement the resource scheduling method provided in the embodiments of this application.

Figure 1B:
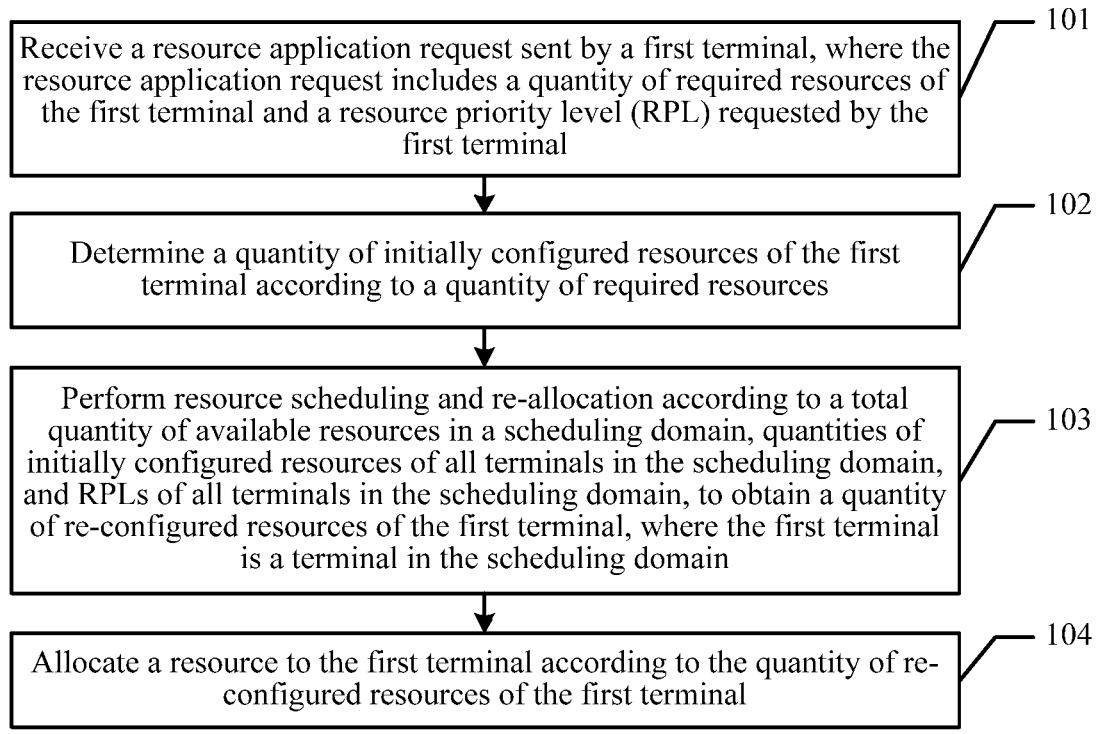
FIG. 1B is a flowchart of a resource scheduling method according to an embodiment of the present disclosure.

A resource scheduling method provided in an embodiment of this application is described below with reference to FIG. 1B. Referring to FIG. 1B, the resource scheduling method may include the followings.

101. Receiving a resource application request sent by a first terminal, where the resource application request includes a quantity of required resources of the first terminal and an RPL requested by the first terminal.

In one embodiment of the present disclosure, a scheduling domain includes terminals of multiple users. The scheduling domain is a division unit of a resource set in a scheduling range. All terminals in the scheduling domain may request allocation of all resources in the resource-set in the scheduling domain. A resource scheduling process of a particular terminal in the scheduling domain is used as an example. For the convenience of description, the terminal needing resource allocation is defined as "the first terminal". Resource allocation for other terminals in the scheduling domain can be performed similar to the first terminal. The resource may include specifically various types of resources, for example, resources such as a central processing unit (CPU) time slice, memory space, disk space and bandwidth, and network bandwidth provided by a computer. A specific resource implementation is not limited, and depends on the user requirement and resource types managed by the scheduling server.

In one embodiment of the present disclosure, when initiating the resource application request to the resource scheduling server by using the first terminal, the user needs to select the quantity of required resources of the user, in other words, how many resources the user requires. In addition, the user further needs to select a required RPL. The RPL may also be referred as a resource priority or resource quality. A higher RPL indicates that more resources are allocated to the first terminal, and a higher RPL indicates higher quality of the resource used by the user. There may be multiple implementations for RPL classification, and RPLs may be classified into at least two different levels. When sending the resource application request to the first terminal, the user may select the RPL required by the user. For example, the RPLs may be classified into a high level and a low level, or may be classified into three levels, namely, a high level, an intermediate level, and a low level. For another example, the RPLs may be alternatively classified into five levels, namely, level 0, level 1, level 2, level 3, and level 4, and specific resource quality and quantity may be configured for each level.

In some embodiments of the present disclosure, the RPL includes at least one of the following level information: exclusive resource occupation, resource sharing, resource quota, resource limit, and resource loan. Then, the first terminal may add corresponding level information to the resource application request according to selection of the user. Exclusive resource occupation is an exclusive resource occupation level, and the amount of resource obtained by the terminal should not be less than the smallest quantity of resources required by the exclusive resource occupation level. This resource level also excludes use of another terminal.

Resource sharing is a sharing-resource occupation level, and the amount of resource quota obtained by the terminal should not be less than the smallest quantity of resources required by the resource sharing occupation level, but, at this level, the terminal and other terminals share the resource. Resource quota (static) is a fixed-amount resource occupation level, and the amount of resource obtained by the terminal is equal to resources defined by the resource quota level, and the resource quota used by the terminal remains unchanged. Resource limit is a limited resource occupation level, and the amount of resource obtained by the terminal does not exceed the resource required by the resource limit level, and some resources at this level may need to be given to a higher-level terminal. Resource loan is a borrowed resource occupation level, and the amount of resource obtained by the terminal does not exceed resources required by the resource loan level. This is different from the resource loan level, in that the resource owned by the terminal may be occupied at any time by another terminal.

In one embodiment of the present disclosure, during resource management, the resource scheduling server needs to consider the resource sharing efficiency, and this is a core performance indicator of the server. The resource sharing efficiency is mainly reflected in two aspects, namely, a satisfaction degree of a single user requirement and overall resource utilization. The satisfaction degree of the single user requirement emphasizes the resource isolation capability of the scheduling system. In other words, it is ensured that availability of a resource for an individual user conforms to an advance definition, and satisfies an expectation of the user. The overall resource utilization emphasizes the resource sharing capability of the scheduling system. In other words, it is ensured that resources are sufficiently shared by all users, and the resource waste is minimized. In one embodiment, the resource scheduling server may implement flexible resource allocation, in other words, non-static resource allocation, and may dynamically adjust resource allocation according to the quantity of required resources and the RPL of the required resources. In one embodiment, when requesting resources, the user needs to input the quantity of required resources and the RPL that are required.

102. Determining the quantity of initially configured resources of the first terminal according to the quantity of required resources.

In one embodiment, after receiving the resource application request sent by the user by using the first terminal, the resource scheduling server first performs initial resource allocation according to the quantity of required resources, in other words, determines the quantity of initially configured resources allocated to the first terminal. The quantity of initially configured resources is determined according to the quantity of required resources requested by the user. The quantity that is of initially configured resources and that is determined by the resource scheduling server is an initially allocated quantity, the quantity of initially configured resources is not the quantity of resources finally allocated to the first terminal, and a scheduling and re-allocation process of step 103 needs to be performed.

It should be noted that, in one embodiment, initial resource allocation is performed for the first terminal in step 102, and initial resource allocation may also be performed for other terminals in the scheduling domain according to the manner in step 102. For example, in addition to the first terminal, the scheduling domain may further include a second terminal, a third terminal, and so on. The resource scheduling server may perform initial resource allocation for the second terminal and the third terminal according to the initial resource allocation manner of the first terminal, and corresponding quantities of initially configured resources may be determined for the second terminal and the third terminal.

103. Performing resource scheduling and re-allocation according to a total quantity of available resources in the scheduling domain, quantities of initially configured resources of all terminals in the scheduling domain, and RPLs of all terminals in the scheduling domain, to obtain the quantity of re-configured resources of the first terminal, where the first terminal is a terminal in the scheduling domain.

In one embodiment, after initial allocation is completed for all terminals in the scheduling domain, the quantities of initially configured resources of all terminals in the scheduling domain may be obtained. For the quantity of initially configured resources and the corresponding RPL of each terminal in the scheduling domain, the resource scheduling server may perform resource scheduling and re-allocation according to the total quantity of available resources in the scheduling domain, the quantities of initially configured resources of all terminals in the scheduling domain, and the RPLs of all terminals in the scheduling domain, to obtain the quantity of re-configured resources of the first terminal. The RPLs of all terminals in the scheduling domain may not be completely the same, and inevitably, some terminals may have higher levels and some may have lower levels. For example, different RPLs correspond to different prices for the users. The user selects required RPL definition and it means that an expectation of the user on resource quality is clarified. In one embodiment, an unequal and limited occupation capability may be provided for a terminal of a higher-level user according to definition against a terminal of a low-level user. A resource quota occupied by the terminal of the higher-level user in a single scheduling period may be a smaller value of the largest quantity of available resources and the quantity of required resources. In other words, the terminal of the user may occupy all available resources in the scheduling period, and in this case, the terminal of the lower-level user needs to wait for allocation in a subsequent scheduling period. If the RPLs of the terminals of all users in the scheduling domain are the same, fair or equal resource scheduling is implemented for the terminals of all users.

It should be noted that in one embodiment, there may be multiple implementations of performing resource scheduling and re-allocation according to the total quantity of available resources in the scheduling domain, the quantity of initially configured resources of all terminals in the scheduling domain, and the RPLs of all terminals in the scheduling domain. For flexible resource scheduling, quantities of initially configured resources in different RPLs may be calculated, and factors such as a smallest resource quantity and a fluctuation range of a resource quantity may affect a final scheduling result. Resource quantities are flexibly adjusted in the scheduling domain, and terminals of different RPLs can use quantities of resources of the corresponding levels. In an actual application, for a specific requirement of an RPL, resource scheduling and re-allocation in a specific level can be used.

In some embodiments of the present disclosure, the resource scheduling server may further determine a resource usage status of the first terminal according to a relationship between an allocated resource quota of the first terminal and an actual resource requirement of the first terminal. Specifically, the resource usage status includes: a busy state corresponding to a case in which the quantity of allocated resources is less than the actual resource requirement of the terminal, and an idle state corresponding to a case in which the quantity of allocated resources is greater than the actual resource requirement of the terminal.

The process of performing resource scheduling and re-allocation according to the total quantity of available resources in the scheduling domain, quantities of initially configured resources of all terminals in the scheduling domain, and RPLs of all terminals in the scheduling domain in step 103 includes the following steps.

A1. Obtaining resource usage statuses of all terminals in the scheduling domain, where the resource usage status includes the busy state corresponding to the case in which the quantity of allocated resources is less than the actual resource requirement of the terminal and the idle state corresponding to the case in which the quantity of allocated resources is greater than the actual resource requirement of the terminal.

A2. Determining, according to the resource usage statuses and the RPLs of all terminals in the scheduling domain and the quantities of initially configured resources of all terminals in the scheduling domain, a sum of smallest quantities of resources in the busy state required by all terminals in the busy state in the scheduling domain, where different quantities of resources are allocated to terminals having different resource usage statuses and/or different RPLs.

A3. Determining the quantity of re-allocatable resources of all terminals in the scheduling domain according to the sum of the smallest quantities of resources in the busy state and the total quantity of available resources in the scheduling domain.

A4. Determining the quantity of re-configured resources of the first terminal according to the quantity of re-allocatable resources of all terminals in the scheduling domain.

The resource scheduling server obtains the resource usage statuses of all terminals in the scheduling domain, where the resource usage status includes the busy state corresponding to the case in which a quantity of allocated resources is less than an actual resource requirement of a terminal and the idle state corresponding to the case in which the quantity of allocated resources is greater than the actual resource requirement of the terminal. For example, the busy state means that a current quantity of resources of the terminal cannot satisfy a user requirement, and more resources need to be allocated. The idle state means that resources currently allocated to the terminal exceed an actually used quantity of user. The sum of the smallest quantities of resources in the busy state required by all terminals in the busy state in the scheduling domain is determined according to the resource usage statuses and the RPLs of all terminals in the scheduling domain and the quantities of initially configured resources of all terminals in the scheduling domain, and different quantities of resources are allocated to terminals having different resource usage statuses and/or different RPLs. For each terminal in the scheduling domain, statistics need to be collected on the smallest quantity of resources of the terminal in the busy state, and the quantities of the smallest quantities of resources are accumulated, to obtain the sum of the smallest quantities of resources in the busy state required by all terminals in the busy state in the scheduling domain. The quantity of re-allocatable resources of all terminals in the scheduling domain is determined according to the sum of the smallest quantities of resources in the busy state and the total quantity of available resources in the scheduling domain. The quantity of re-allocatable resources of all terminals in the scheduling domain is a quantity of resources on which dynamic adjustment can be performed when basic requirements of all terminals in the scheduling domain are satisfied. Finally, resource scheduling and re-allocation are performed according to the quantity of re-allocatable resources of all terminals in the scheduling domain, and the quantity of re-configured resources of the first terminal is determined according to a resource re-allocation result. Specifically, scheduling and re-allocation may be performed on the quantity of initially configured resources of the first terminal according to a specific value of the quantity of re-allocatable resources of all terminals in the scheduling domain and the RPL of the first terminal. For example, a larger quantity of re-allocatable resources of all terminals in the scheduling domain indicates that more resources can be scheduled to the first terminal, and a smaller quantity of re-allocatable resources of all terminals in the scheduling domain indicates that fewer resources are scheduled to the first terminal.

In some embodiments of the present disclosure, the process of determining the quantity of re-allocatable resources of all terminals in the scheduling domain according to the sum of the smallest quantities of resources in the busy state and the total quantity of available resources in the scheduling domain in step A3 specifically includes the following step:

A31. Calculating a difference between the total quantity of available resources in the scheduling domain and the sum of the smallest quantities of resources in the busy state to obtain the quantity of re-allocatable resources of all terminals in the scheduling domain.

The difference between the total quantity of available resources in the scheduling domain and the sum of the smallest quantities of resources in the busy state is calculated to obtain the quantity of re-allocatable resources of all terminals in the scheduling domain. A process of calculating the quantity of re-allocatable resources of all terminals in the scheduling domain may be implemented in a manner in which the difference between the total quantity of available resources in the scheduling domain and the sum of the smallest quantities of resources in the busy state is calculated and then is corrected. For example, an adjustment proportion is determined according to a sum of the RPLs of all terminals in the scheduling domain, and a difference calculation result is multiplied by the adjustment percentage to obtain the quantity of re-allocatable resources of all terminals in the scheduling domain.

In some embodiments of the present disclosure, the process of determining the quantity of re-configured resources of the first terminal according to the quantity of re-allocatable resources of all terminals in the scheduling domain in step A4 includes the following steps:

A41. Determining whether the quantity of re-allocatable resources of all terminals in the scheduling domain is equal to 0.

A42. If the quantity of re-allocatable resources of all terminals in the scheduling domain is not equal to 0, determine, according to a resource usage status and an RPL of the first terminal and resource usage statuses and RPLs of other terminals than the first terminal in the scheduling domain, that the quantity of re-configured resources of the first terminal is equal to a sum of the quantity of initially configured resources of the first terminal and a quantity of re-allocatable resources of the first terminal.

A43. If the quantity of re-allocatable resources of all terminals in the scheduling domain is equal to 0, determine that the quantity of re-configured resources of the first terminal is equal to the quantity of initially configured resources of the first terminal.

If the quantity of re-allocatable resources of all terminals in the scheduling domain is not equal to 0, it indicates that scheduling and re-allocation need to be performed on the quantities of initially configured resources of all terminals in the scheduling domain, to change quantities of resources corresponding to terminals of different RPLs in the scheduling domain. For example, it is determined, according to the resource usage status and the RPL of the first terminal and resource usage statuses and RPLs of other terminals than the first terminal in the scheduling domain, that the quantity of re-configured resources of the first terminal is equal to the sum of the quantity of initially configured resources of the first terminal and the quantity of re-allocatable resources of the first terminal. An RPL and a resource usage status of each terminal in the scheduling domain may affect a specific scheduling and re-allocation manner. If the quantity of re-allocatable resources of all terminals in the scheduling domain is equal to 0, it indicates that current resource allocation manners of all terminals in the scheduling domain just satisfy requirements of corresponding RPLs on resource quantities, and in this case, it may be determined that the quantity of re-configured resources of the first terminal is equal to the quantity of initially configured resources of the first terminal.

Further, in some embodiments of the present disclosure, the determining, according to a resource usage status and an RPL of the first terminal and resource usage statuses and RPLs of other terminals than the first terminal in the scheduling domain, that the quantity of re-configured resources of the first terminal is equal to a sum of the quantity of initially configured resources of the first terminal and a quantity of re-allocatable resources of the first terminal in step A42 includes the following:

A421. If the quantity of re-allocatable resources of all terminals in the scheduling domain is greater than 0, the quantity of re-allocatable resources of the first terminal is a quantity of resources allocated to the first terminal when resource scheduling and re-allocation is performed on the quantity of re-allocatable resources of all terminals in the scheduling domain according to the resource usage statuses and the RPLs of all terminals in the scheduling domain.

A422. If the quantity of re-allocatable resources of all terminals in the scheduling domain is less than 0, the quantity of re-allocatable resources of the first terminal is a quantity of schedulable resources of the first terminal determined in the following manner: a particular quantity of resources are divided from a first terminal set according to the resource usage statuses and the RPLs of all terminals in the scheduling domain, the particular quantity of resources are re-allocated to a second terminal set, and the quantity of schedulable resources of the first terminal is determined according to a set to which the first terminal belongs and the particular quantity of resources.

Specifically, if the quantity of re-allocatable resources of all terminals in the scheduling domain is greater than 0, it indicates that a resource remains in the total quantity of available resources in the scheduling domain, and re-allocation is performed on the quantity of re-allocatable resources of all terminals in the scheduling domain according to the resource usage statuses and the RPLs of all terminals in the scheduling domain. If the quantity of re-allocatable resources are allocated to the first terminal according to the resource usage status and the RPL, the quantity of re-allocatable resources of the first terminal is added to the quantity of initially configured resources of the first terminal, so that extra resources are allocated to the first terminal, and more resources in addition to the quantity of required resources required by the user may be configured for the first terminal, thereby improving resource use quality of the user.

If the quantity of re-allocatable resources of all terminals in the scheduling domain is less than 0, it indicates that the total quantity of available resources in the scheduling domain cannot satisfy requirements of all terminals in the scheduling domain. To satisfy a resource requirement of a terminal of a high RPL, all terminals in the scheduling domain are classified into a first terminal set and a second terminal set according to the resource usage statuses and the RPLs. The first terminal set is a set of terminals from which whose resources need to be taken away, and the second terminal set is a set of terminals to which extra resources may be allocated. It may be understood that, compared with the second terminal set, the first terminal set is a set of terminals of lower RPLs. In this way, resource allocation needs to be performed on the quantity of initially allocated resources in the scheduling domain again. A particular quantity of resources are divided from the first terminal set according to the resource usage statuses and the RPLs of all terminals in the scheduling domain, and the particular quantity of resources are re-allocated to the second terminal set. The first terminal may belong to the first terminal set or may belong to the second terminal set.

Further, in an implementation scenario of step A421, the resource scheduling method provided in one embodiment may further include the following steps.

B1. Adding a new terminal to the scheduling domain if the quantity of re-allocatable resources of all terminals in the scheduling domain is greater than 0 and some re-allocatable resources remain after the re-allocatable resources of all terminals in the scheduling domain are re-allocated according to the resource usage statuses and the RPLs of all terminals in the scheduling domain.

B2. Allocating the re-allocatable resources to the new terminal.

After the resource scheduling server re-allocates the re-allocatable resources of all terminals in the scheduling domain according to the resource usage statuses and the RPLs of all terminals in the scheduling domain, if some re-allocatable resources remain, resource overselling may be implemented, and the resource scheduling server may add a new terminal to the scheduling domain, and allocate the re-allocatable resources to the new terminal, thereby improving the resource utilization.

104. Allocating a resource to the first terminal according to the quantity of re-configured resources of the first terminal.

In one embodiment, after the scheduling and re-allocation process for the first terminal in step 103, the quantity of re-configured resources of the first terminal may be determined, and the resource scheduling server may allocate an actually-available resource quota to the first terminal according to the quantity of re-configured resources of the first terminal. The quantity of re-configured resources that is obtained after the scheduling and re-allocation is a basis used for finally allocating the resource quota to the first terminal. After scheduling and re-allocation, the first terminal can use a resource quota satisfying the RPL selected by the user, so that the first terminal can provide a resource service for the user by using the actually available resource quota allocated by the resource scheduling server. For example, the user obtains a storage space resource from the resource scheduling server. The resource scheduling server may allocate a storage space resource quota to the first terminal after initial allocation and scheduling and re-allocation, and the user may use the storage space resource according to the storage space resource quota. The user selects the RPL during resource application, and the resource scheduling server may allocate, to the terminal, the resource quota corresponding to the RPL, and perform dynamic resource allocation according to a resource requirement of the user and an actual usage status, so that the overall resource utilization can be maximized when high-quality resource use of the user is ensured, and costs of a unit resource can be reduced.

As can be learned from above descriptions, first, the quantity of initially configured resources of the first terminal may be determined. Further, scheduling and re-allocation are performed for all terminals in the scheduling domain according to the total quantity of available resources, the quantity of initially configured resources of each terminal, and the RPL of each terminal, to obtain the quantity of re-configured resources of the first terminal, and resource allocation is performed for the first terminal by using the quantity of re-configured resources of the first terminal. In other words, the quantity of resources finally allocated to the first terminal depends on the quantity of re-configured resources of the first terminal. Therefore, in one embodiment, no static resource allocation is used, instead, first, initial allocation is performed according to resource requirements of terminals, and then, scheduling and re-allocation are performed according to resource distribution in the scheduling domain, to determine, after initial allocation and scheduling and re-allocation, a quantity of resources actually allocated to the first terminal, so that the resource utilization can be improved and resource quality can be ensured. Dynamic resource allocation is performed according to a resource requirement of a user and an actual usage status, so that the overall resource utilization can be maximized when the high-quality resource use of the user is ensured, and the costs of the unit resource can be reduced.

To better understand and implement the foregoing solutions of the embodiments of the present disclosure, the following gives a specific description by using a corresponding application scenario as an example.

In one embodiment, flexible scheduling based on resource grading is provided. A resource requirement allowed to be defined includes a quantity of required resources and an RPL, thereby satisfying requirements of various types of scheduling scenarios. Definition of a resource quota of the terminal is merely one input in the scheduling process, and a scheduling system may further flexibly allocate resources according to a busy/idle degree of resources, in other words, RPLs and quantities of required resources of other terminals at a same moment, thereby satisfying the resource requirement of the terminal when thoroughly resolving a resource waste problem. In one embodiment, an unequal and limited occupation capability may be provided for a terminal of a higher-level user according to definition and relative to a terminal of a lower-level user. A quota occupied by the terminal of the higher-level user in a single scheduling period may be a smaller value in a largest quantity of available resources and a quantity of required resources. In other words, the terminal may occupy all available resources in the scheduling period, and in this case, the terminal of the lower-level user needs to wait for allocation in a subsequent scheduling period.

The scheduling domain in one embodiment is a set of resources, and is a division unit of a scheduling range. Flexible scheduling and allocation in one embodiment is non-static resource allocation, and is a scheduling manner of dynamically adjusting resource allocation according to a definition and a usage status. An RPL is a guarantee of quality/level of a resource used by the terminal. A highest level is exclusive resource occupation, and even if an exclusively occupied resource is in an idle state, the resource is not allocated to a terminal of another user. A lowest level is resource loan, and even if a terminal is being using a borrowed resource, the resource needs to be returned at any time. A resource quota is a quantity of resources currently allocated to a terminal.

Subsequently, an example in which a flexible resource scheduling solution is applied to cloud computing, for example, applied to a resource sharing/selling platform such as cloud storage and a cloud network, is used. The resource scheduling efficiency directly determines costs of a resource sold on the platform, and is a core technology for the platform to maintain a contention advantage and establish a threshold. A user of the cloud platform pays most attention to a price and quality of a resource. To reduce the price of the resource, the core is to improve the resource utilization and increase the resource sharing/selling rate and even an overselling rate to reduce resource costs. To ensure the quality of the resource, it is to fulfill a promise of availability of the resource for the user and provide sufficient resources according to a definition of the terminal.

Flexible scheduling provided in one embodiment can ensure maximization of the resource utilization and, in addition, when resource allocation is implemented according to the definition of the RPL, quality of the resource obtained by the terminal can be ensured to the greatest degree. Accordingly, requirements of the user for different levels of resources can be satisfied, and resource use manners such as exclusive resource occupation, resource sharing, resource quota, resource limit, and resource loan can be implemented. The user needs to input a quantity of required resources and a level during resource application. A flexible scheduling system may calculate an initial quantity of resources, a smallest quantity of resources, a fluctuation range of a resource quantity, and the like of the terminal, and implement resource matching and allocation according to a current total quantity of resources and usage statuses of other terminals. Different RPLs correspond to different prices, and that the user completes defining an RPL required by the user means that the user clarifies an expectation on resource quality. Thus, a resource selling rate/overselling rate can be further improved effectively. By using flexible resource scheduling, secondary allocation may be performed, without violating the definition of RPL, on resources that are allocated but not used, and resource overselling is implemented after the resources are sold to a terminal of a new user.

First, the RPL used in one embodiment is described by way of example. Busy means that a quantity of currently allocated resources cannot satisfy the user requirement, and more resources need to be allocated. Idle means that currently allocated resources exceed a quantity of currently used resources of the user. As shown in Table 1:

| RPL | Busy | Idle |
| --- | --- | --- |
| 0, Exclusive | Quota <= X <= MAX | X == Quota |
| 1, Share | Quota <= X <= MAX | MIN <= X < Quota |
| 2, Static | X == Quota | X == Quota |
| 3, Limited | X == Quota | MIN <= X < Quota |
| 4, Loan | MIN <= X <= Quota | MIN <= X < Quota |

X is initial resource configuration data allocated to the terminal in different RPLs, MIN is a smallest resource allocation unit, MAX is a largest quantity of available resources, and Quota is a resource quota allocated to the terminal. Exclusive is an exclusive level, and regardless of busy or idle, a resource quota obtained by the terminal cannot be less than a defined resource quota. Share is a sharing level, and the terminal may loan resources in an idle state, and in a busy state, may obtain resources more than a defined resource quota. Static is a quantization level, and regardless of busy or idle, resources that the terminal can obtain are always equal to a defined quota. Limited is a limit level, and resources obtained by the terminal in the busy state do not exceed a defined quota, and the terminal may loan resources in an idle state. Loan is a loaning level. A difference from the limit level lies in that even if the terminal is currently in a busy state, resources owned by the terminal can be occupied by another terminal.

Ensuring the resource quality is to satisfy a requirement of the terminal in the busy/idle state for a smallest resource quantity. The resource allocation process in one embodiment includes determining whether to perform allocation, and a determining basis is that a sum of smallest quantities of resources required by all terminals in the busy state is less than or equal to a total quantity of available resources.

The following describes a flexible resource scheduling process by way of example.

First, calculation of resource re-allocation is performed at a starting moment of each scheduling period, and a quantity of re-allocatable resources in each level is as follows:

| A current resource quantity is X. | Busy (RT−) | Idle (RT+) |
| --- | --- | --- |
| 0, Exclusive | 0 | X − Quota |
| 1, Share | Quota − X(X < Quota) | X − MIN |
| 2, Static | 0 | 0 |
| 3, Limited | Quota − X(X < Quota) | X − MIN |
| 4, Loan | X − MIN | X − MIN |

A sum of quantities of re-allocatable resources of all terminals is represented by using RT. In some cases, a terminal may release resources, for example, when the terminal in an exclusive level changes from the busy state to the idle state. In some cases, a terminal needs more resources, for example, when the terminal of a sharing level changes from the idle state to the busy state. Therefore, a calculated RT may be positive value, a negative value, or 0.

If RT>0, it means that available resources remain after a smallest resource requirement is satisfied, and in this case, the remaining resources are allocated to a terminal of a high-priority user, to implement resource expansion. The remaining resources are preferentially allocated to a terminal in the busy state in descending order of priorities. If some resources still remain after the allocation, the resources are allocated to a terminal in the idle state in descending order of priorities. For example, an overall allocation sequence is: exclusive (busy)>sharing (busy)>loan (busy)>sharing (idle) >limited (idle)>loan (idle).

If RT<0, it means that a resource requirement of the terminal exceeds a quantity of available resources, and in this case, secondary resource re-allocation is needed, to shrink quantities of allocated resources of some terminals. The secondary re-allocation is allowed to be performed only for an exclusive level and a sharing level. Opposite to the previous resource expansion, a resource shrinking sequence is an ascending order of priorities. In other words, resources of a terminal of a user in the sharing level are shrunk first, and then, resources of a terminal of a user in the exclusive level are shrunk, to a smallest resource quantity, namely, a resource quota of the terminal. If the calculated RT is still less than 0 after the shrinking, terminal migration needs to be performed.

If RT=0, no resource expansion or shrinking needs to be performed.

If resources remain after re-allocation is performed when RT>0, resource overselling may be performed, it is determined, according to a total quantity of resources actually used by all terminals in the scheduling domain, whether to perform resource overselling. If the total quantity of actually used resources is always less than a total quantity of available resources, resource overselling may be performed, and a terminal of a new user is added to the scheduling domain.

An embodiment of the present disclosure provides a resource scheduling system that performs dynamic resource allocation based on RPL and resource quantity definitions according to a resource requirement of the user and an actual usage status, so that the overall resource utilization can be maximized when the high-quality resource use of the user is ensured, and the costs of the unit resource can be reduced. By using the scheduling method provided in one embodiment, an overall selling rate of a resource sharing/selling system such as a cloud platform can be increased, selling benefits of the system can be increased, and technology/commercial competition of the system can be improved. In the flexible resource scheduling method provided in the present disclosure, resources are flexibly allocated to all terminals, so that the resource utilization is maximized when it is ensured that each user can securely use the resources according to the definition, thereby achieving high resource sharing efficiency.

It should be noted that one embodiment describes a flexible resource scheduling solution, but does not limit a type of a resource. The cloud computing platform and the like are merely an example of a service scenario of the resource scheduling solution. Definitions of five RPLs such as exclusive and sharing in one embodiment are merely used to define the RPLs, or are merely an implementation of defining resource quality. Another resource grading manner or different resource quality definitions should fall within the scope of flexible scheduling performed based on the definitions of the RPLs and the resource quantities in one embodiment. The scheduling steps such as resource re-allocation, and resource expansion and shrinking in one embodiment are merely a manner of implementing flexible resource scheduling. Other methods of implementing dynamic resource quota adjustment according to definitions of user requirements and usage statuses, or different scheduling/re-allocation policies shall fall within the scope of one embodiment.

It should be noted that, to make the description brief, the foregoing method embodiments are expressed as a series of actions. However, because some steps may be performed in other sequences or performed simultaneously according to the present disclosure, persons skilled in the art should appreciate that the present disclosure is not limited to the described action sequence. In addition, persons skilled in the art should also appreciate that all the embodiments described in the specification are exemplary embodiments, and the related actions and modules are not necessarily mandatory to the present disclosure.

To better understand the solutions of the embodiments of the present disclosure, an embodiment of the present disclosure further provides a resource scheduling server. The server is described below with reference to FIG. 2A.

Figure 2A:
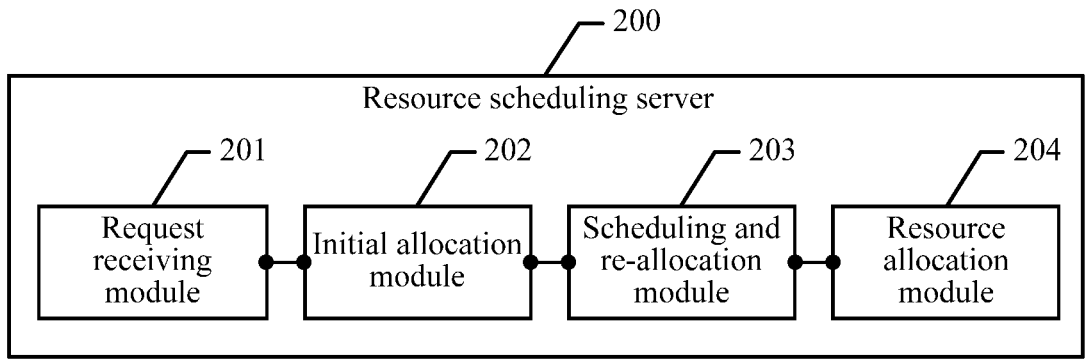
FIG. 2A is a schematic composition structural diagram of a resource scheduling server according to an embodiment of the present disclosure.

Referring to FIG. 2A, FIG. 2A is a schematic composition structural diagram of a resource scheduling server according to an embodiment of the present disclosure. As shown in FIG. 2A, the server includes a request receiving module 201, an initial allocation module 202, a scheduling and re-allocation module 203, and a resource allocation module 204, etc.

The request receiving module 201 is configured to receive a resource application request sent by a first terminal, the resource application request including a quantity of resources required by the first terminal and an RPL requested by the first terminal. The initial allocation module 202 is configured to determine a quantity of initially configured resources of the first terminal according to the quantity of required resources.

The scheduling and re-allocation module 203 is configured to perform resource scheduling and re-allocation according to a total quantity of available resources in a scheduling domain, quantities of initially configured resources of all terminals in the scheduling domain, and RPLs of all terminals in the scheduling domain, to obtain a quantity of re-configured resources of the first terminal, the first terminal is a terminal in the scheduling domain. The resource allocation module 204 is configured to allocate a resource to the first terminal according to the quantity of re-configured resources of the first terminal.

Figure 2B:
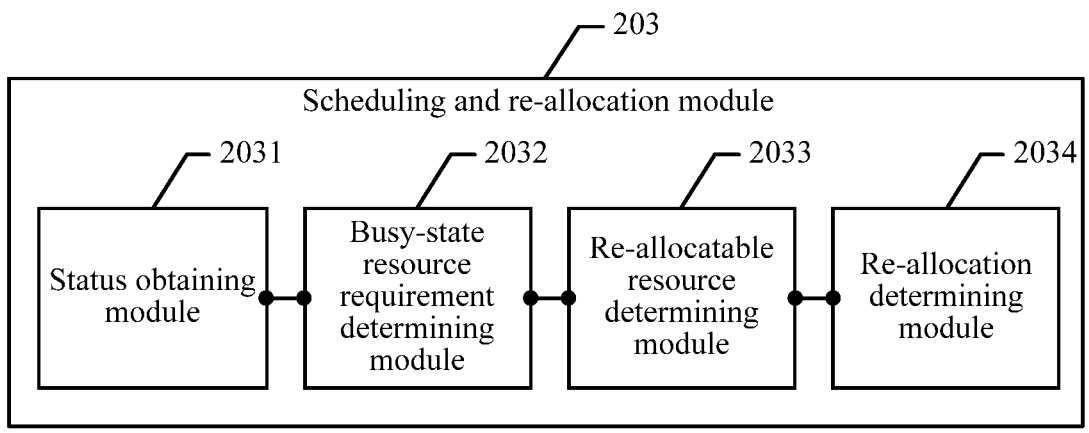
FIG. 2B is a schematic composition structural diagram of a scheduling and re-allocation module according to an embodiment of the present disclosure.

In some embodiments of the present disclosure, referring to FIG. 2B, the scheduling and re-allocation module 203 includes a status obtaining module 2031, a busy-state resource requirement determining module 2032, a re-allocatable resource determining module 2033, and a re-allocation determining module 2034, etc.

The status obtaining module 2031 is configured to obtain resource usage statuses of all terminals in the scheduling domain, where the resource usage status includes a busy state corresponding to a case in which a quantity of allocated resources is less than an actual resource requirement of a terminal and an idle state corresponding to a case in which the quantity of allocated resources is greater than the actual resource requirement of the terminal.

The busy-state resource requirement determining module 2032 is configured to determine, according to the resource usage statuses and the RPLs of all terminals in the scheduling domain and the quantities of initially configured resources of all terminals in the scheduling domain, a sum of smallest quantities of resources in the busy state required by all terminals in the busy state in the scheduling domain, where different quantities of resources are allocated to terminals having different resource usage statuses and/or different RPLs.

The re-allocatable resource determining module 2033 is configured to determine a quantity of re-allocatable resources of all terminals in the scheduling domain according to the sum of the smallest quantities of resources in the busy state and the total quantity of available resources in the scheduling domain.

The re-allocation determining module 2034 is configured to determine the quantity of re-configured resources of the first terminal according to the quantity of re-allocatable resources of all terminals in the scheduling domain.

Further, in some embodiments of the present disclosure, the re-allocatable resource determining module 2033 is specifically configured to calculate a difference between the total quantity of available resources in the scheduling domain and the sum of the smallest quantities of resources in the busy state to obtain the quantity of re-allocatable resources of all terminals in the scheduling domain.

Figure 2C:
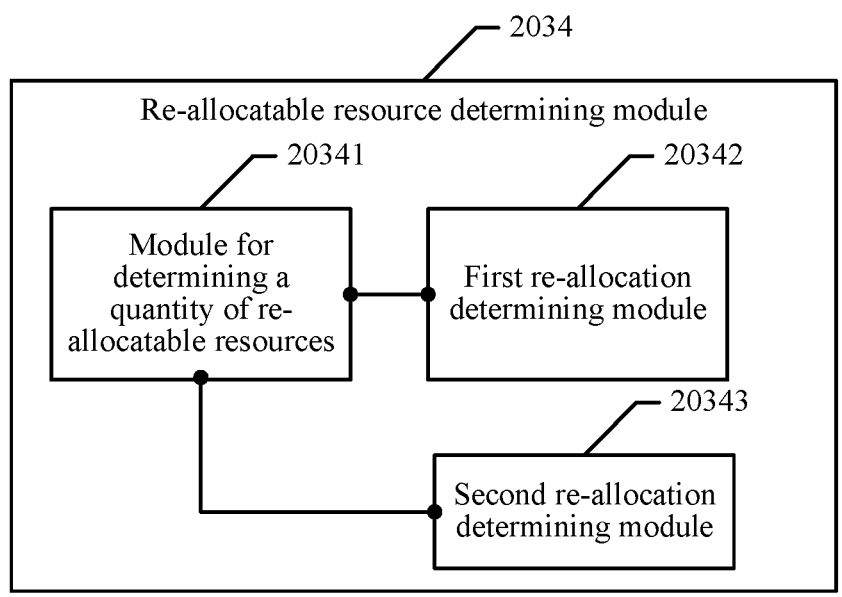
FIG. 2C is a schematic composition structural diagram of a re-allocation determining module according to an embodiment of the present disclosure.

In some embodiments of the present disclosure, referring to FIG. 2C, the re-allocation determining module 2034 includes a module 20341, a first re-allocation determining module 20342, and a second re-allocation determining module 20343, etc.

The module 20341 is configured for determining a quantity of re-allocatable resources, configured to determine whether the quantity of re-allocatable resources of all terminals in the scheduling domain is equal to 0.

The first re-allocation determining module 20342 is configured to: if the quantity of re-allocatable resources of all terminals in the scheduling domain is not equal to 0, determine, according to a resource usage status and an RPL of the first terminal and resource usage statuses and RPLs of other terminals than the first terminal in the scheduling domain, that the quantity of re-configured resources of the first terminal is equal to a sum of the quantity of initially configured resources of the first terminal and a quantity of re-allocatable resources of the first terminal.

The second re-allocation determining module 20343 is configured to: if the quantity of re-allocatable resources of all terminals in the scheduling domain is equal to 0, determine that the quantity of re-configured resources of the first terminal is equal to the quantity of initially configured resources of the first terminal.

Further, in some embodiments of the present disclosure, the quantity of re-allocatable resources of the first terminal may be determined according to the followings.

If the quantity of re-allocatable resources of all terminals in the scheduling domain is greater than 0, the quantity of re-allocatable resources of the first terminal is a quantity of resources allocated to the first terminal when resource scheduling and re-allocation is performed on the quantity of re-allocatable resources of all terminals in the scheduling domain according to the resource usage statuses and the RPLs of all terminals in the scheduling domain. If the quantity of re-allocatable resources of all terminals in the scheduling domain is less than 0, the quantity of re-allocatable resources of the first terminal is a quantity of schedulable resources of the first terminal determined in the following manner: a particular quantity of resources are divided from a first terminal set according to the resource usage statuses and the RPLs of all terminals in the scheduling domain, the particular quantity of resources are re-allocated to a second terminal set, and the quantity of schedulable resources of the first terminal is determined according to a set to which the first terminal belongs and the particular quantity of resources.

Further, in some embodiments of the present disclosure, the resource allocation module 204 is further configured to: add a new terminal to the scheduling domain if the quantity of re-allocatable resources of all terminals in the scheduling domain is greater than 0 and some re-allocatable resources remain after the resource scheduling server re-allocates the re-allocatable resources of all terminals in the scheduling domain according to the resource usage statuses and the RPLs of all terminals in the scheduling domain; and allocate the re-allocatable resources to the new terminal.

In some embodiments of the present disclosure, the RPL includes at least one of the following level information: exclusive resource occupation, resource sharing, resource quota, resource limit, and resource loan.

As can be learned from above descriptions, first, the quantity of initially configured resources of the first terminal may be determined. Further, scheduling and re-allocation are performed for all terminals in the scheduling domain according to the total quantity of available resources, a quantity of initially configured resources of each terminal, and an RPL of each terminal, to obtain the quantity of re-configured resources of the first terminal, and resource allocation is performed for the first terminal by using the quantity of re-configured resources of the first terminal. In other words, a quantity of resources finally allocated to the first terminal depends on the quantity of re-configured resources of the first terminal. Therefore, in one embodiment, no static resource allocation is used, instead, first, initial allocation is performed according to resource requirements of terminals, and then, scheduling and re-allocation are performed according to resource distribution in the scheduling domain, to determine, after initial allocation and scheduling and re-allocation, a quantity of resources actually allocated to the first terminal, so that the resource utilization can be improved and resource quality can be ensured. Dynamic resource allocation is performed according to a resource requirement of a user and an actual usage status, so that the overall resource utilization can be maximized when high-quality resource use of the user is ensured, and costs of a unit resource are reduced.

For the convenience of better understanding of the solutions of the embodiments of the present disclosure, the server provided in the embodiments of the present disclosure is described below. The server includes a processor and a memory. The memory is configured to store program code, and transmit the program code to the processor; and the processor is configured to perform the resource scheduling method according to an instruction in the program code.

Figure 3:
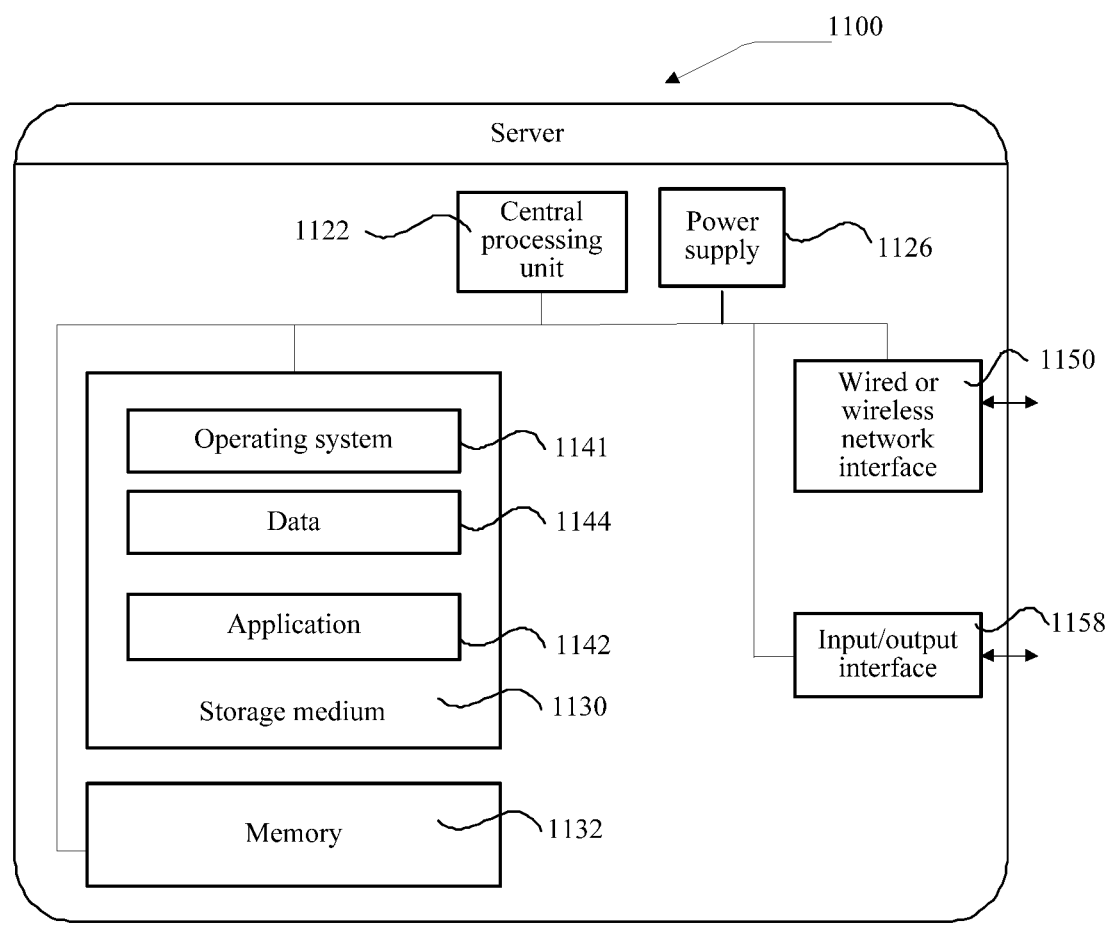
FIG. 3 is a schematic composition structural diagram of a server according to an embodiment of the present disclosure.

Referring to FIG. 3, FIG. 3 is a schematic composition structural diagram of a server according to an embodiment of the present disclosure. As shown in FIG. 3, a server 1100 may be different due to different configurations or performance, and may include one or more CPUs 1122 (for example, one or more processors), a memory 1132, and one or more storage mediums 1130 (for example, one or more massive storage devices) storing an application 1142 or data 1144. The memory 1132 and the storage medium 1130 may be transient or persistent storages. The program stored in the storage medium 1130 may include one or more modules (not shown in the figure), and each module may include a series of instruction operations in the server. Still further, the CPU 1122 may be configured to communicate with the storage medium 1130, and perform, on the server 1100, a series of instructions and operations in the storage medium 1130.

The server 1100 may further include one or more power supplies 1126, one or more wired or wireless network interfaces 1150, one or more input/output interfaces 1158, and/or one or more OSs 1141, for example, Windows Server™, Mac OS X™, Unix™, Linux™, or FreeBSD™.

The steps of the resource scheduling method performed by the server in the foregoing embodiment may be based on the structure of the server shown in FIG. 3.

In addition, an embodiment of the present disclosure further provides a storage medium. The storage medium is configured to store program code, and the program code is configured to perform the resource scheduling method.

According to another aspect, an embodiment of the present disclosure further provides a computer program product including an instruction. When the computer program product runs on a computer, the computer performs the resource scheduling method.

According to still another aspect, an embodiment of the present disclosure provides a resource scheduling method, including: receiving, by a resource scheduling server, a resource application request sent by a first terminal, the resource application request including a quantity of required resources of the first terminal and an RPL requested by the first terminal;

determining, by the resource scheduling server, a quantity of initially configured resources of the first terminal according to the quantity of required resources; performing, by the resource scheduling server, resource scheduling and re-allocation according to a total quantity of available resources in a scheduling domain, quantities of initially configured resources of all terminals in the scheduling domain, and RPLs of all terminals in the scheduling domain, to obtain a quantity of re-configured resources of the first terminal, where the first terminal is a terminal in the scheduling domain; and allocating, by the resource scheduling server, a resource to the first terminal according to the quantity of re-configured resources of the first terminal.

During specific implementation, the process of performing, by the resource scheduling server, resource scheduling and re-allocation according to a total quantity of available resources in a scheduling domain, quantities of initially configured resources of all terminals in the scheduling domain, and RPLs of all terminals in the scheduling domain, to obtain a quantity of re-configured resources of the first terminal includes: obtaining, by the resource scheduling server, resource usage statuses of all terminals in the scheduling domain, where the resource usage status includes a busy state corresponding to a case in which a quantity of allocated resources is less than an actual resource requirement of a terminal and an idle state corresponding to a case in which the quantity of allocated resources is greater than the actual resource requirement of the terminal; determining, by the resource scheduling server according to the resource usage statuses and the RPLs of all terminals in the scheduling domain and the quantities of initially configured resources of all terminals in the scheduling domain, a sum of smallest quantities of resources in the busy state required by all terminals in the busy state in the scheduling domain, where different quantities of resources are allocated to terminals having different resource usage statuses and/or different RPLs; determining, by the resource scheduling server, a quantity of re-allocatable resources of all terminals in the scheduling domain according to the sum of the smallest quantities of resources in the busy state and the total quantity of available resources in the scheduling domain; and determining, by the resource scheduling server, the quantity of re-configured resources of the first terminal according to the quantity of re-allocatable resources of all terminals in the scheduling domain.

During specific implementation, the determining, by the resource scheduling server, a quantity of re-allocatable resources of all terminals in the scheduling domain according to the sum of the smallest quantities of resources in the busy state and the total quantity of available resources in the scheduling domain includes: calculating, by the resource scheduling server, a difference between the total quantity of available resources in the scheduling domain and the sum of the smallest quantities of resources in the busy state to obtain the quantity of re-allocatable resources of all terminals in the scheduling domain.

During specific implementation, the determining, by the resource scheduling server, the quantity of re-configured resources of the first terminal according to the quantity of re-allocatable resources of all terminals in the scheduling domain includes: determining, by the resource scheduling server, whether the quantity of re-allocatable resources of all terminals in the scheduling domain is equal to 0; if the quantity of re-allocatable resources of all terminals in the scheduling domain is not equal to 0, determining, by the resource scheduling server according to a resource usage status and an RPL of the first terminal and resource usage statuses and RPLs of other terminals than the first terminal in the scheduling domain, that the quantity of re-configured resources of the first terminal is equal to a sum of the quantity of initially configured resources of the first terminal and a quantity of re-allocatable resources of the first terminal; and if the quantity of re-allocatable resources of all terminals in the scheduling domain is equal to 0, determining, by the resource scheduling server, that the quantity of re-configured resources of the first terminal is equal to the quantity of initially configured resources of the first terminal.

During specific implementation, the quantity of re-allocatable resources of the first terminal may be determined by using the following manner: if the quantity of re-allocatable resources of all terminals in the scheduling domain is greater than 0, the quantity of re-allocatable resources of the first terminal is a quantity of resources allocated by the resource scheduling server to the first terminal when the resource scheduling server performs resource scheduling and re-allocation on the quantity of re-allocatable resources of all terminals in the scheduling domain according to the resource usage statuses and the RPLs of all terminals in the scheduling domain; and if the quantity of re-allocatable resources of all terminals in the scheduling domain is less than 0, the quantity of re-allocatable resources of the first terminal is a quantity of schedulable resources of the first terminal determined by the resource scheduling server in the following manner: the resource scheduling server divides a particular quantity of resources from a first terminal set according to the resource usage statuses and the RPLs of all terminals in the scheduling domain, re-allocates the particular quantity of resources to a second terminal set, and determines the quantity of schedulable resources of the first terminal according to a set to which the first terminal belongs and the particular quantity of resources.

During specific implementation, the method further includes: adding a new terminal to the scheduling domain if the quantity of re-allocatable resources of all terminals in the scheduling domain is greater than 0 and some re-allocatable resources remain after the resource scheduling server re-allocates the re-allocatable resources of all terminals in the scheduling domain according to the resource usage statuses and the RPLs of all terminals in the scheduling domain; and allocating, by the resource scheduling server, the re-allocatable resources to the new terminal.

During specific implementation, the RPL includes at least one of the following level information: exclusive resource occupation, resource sharing, resource quota, resource limit, and resource loan.

In the resource scheduling method provided in one embodiment, the resource scheduling server may first determine the quantity of initially configured resources of the first terminal, then, perform scheduling and re-allocation for all terminals in the scheduling domain according to the total quantity of available resources, a quantity of initially configured resources of each terminal, and an RPL of each terminal, to obtain the quantity of re-configured resources of the first terminal, and perform resource allocation for the first terminal by using the quantity of re-configured resources of the first terminal. In other words, a quantity of resources finally allocated to the first terminal depends on the quantity of re-configured resources of the first terminal. Therefore, in one embodiment, no static resource allocation is used, instead, the resource scheduling server first performs initial allocation according to resource requirements of terminals, and then, performs scheduling and re-allocation according to resource distribution in the scheduling domain, to determine, after initial allocation and scheduling and re-allocation, a quantity of resources actually allocated to the first terminal, so that the resource utilization rate can be improved and resource quality can be ensured. Dynamic resource allocation is performed according to a resource requirement of a user and an actual usage status, so that the overall resource utilization can be maximized when high-quality resource use of the user is ensured, and costs of a unit resource are reduced.

In addition, it should be noted that the apparatus embodiment and the last method embodiment having an execution body are merely exemplary. Units used as separate parts may or may not be physically separate. Parts displayed as units may or may not be physical units, that is, may be located at one location, or may be distributed on multiple network units. Some or all the modules may be selected according to actual needs to achieve the objectives of the solutions of the embodiments. In addition, in the accompanying drawings of the apparatus embodiments provided by the present disclosure, connection relationships between the modules indicate that the modules have communication connections with each other, which may be specifically implemented as one or more communications buses or signal cables. A person of ordinary skill in the art may understand and implement the embodiments of the present disclosure without creative efforts.

Based on the description of the foregoing implementation manners, a person skilled in the art may clearly understand that the present disclosure may be implemented by software plus necessary universal hardware, or by dedicated hardware, including an application-specific integrated circuit, a dedicated CPU, a dedicated memory, a dedicated component, and the like. Generally, any functions that can be performed by a computer program can be easily implemented by using corresponding hardware. Moreover, a specific hardware structure used to achieve a same function may be of various forms, for example, in a form of an analog circuit, a digital circuit, a dedicated circuit, or the like. However, as for the present disclosure, software program implementation is a better implementation manner in most cases. Based on such understanding, the technical solutions of the present disclosure essentially or a part contributing to the prior art may be represented in a form of a software product. The computer software product is stored in a readable storage medium, for example, a floppy disk, a USB drive, a removable hard disk, a read-only memory (ROM), a RAM, a magnetic disk, or an optical disc, and includes several instructions used to enable a computer device (which may be a personal computer, a server, or a network device) to perform the method in the embodiments of the present disclosure.

In conclusion, the foregoing embodiments are merely intended for describing the technical solutions of the present disclosure rather than limiting the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, as long as such modifications and replacements do not cause the essence of the present disclosure to depart from the spirit and scope of the technical solutions of the embodiments of the present disclosure.

What is claimed is:

1. A resource scheduling method, comprising:
receiving, by a resource scheduling server, a resource application request sent by a first terminal, the resource application request including a quantity of required resources of the first terminal and a resource priority level (RPL) requested by the first terminal;
determining, by the resource scheduling server, a quantity of initially configured resources of the first terminal according to the quantity of required resources;
performing, by the resource scheduling server, resource scheduling and re-allocation according to a total quantity of available resources in a scheduling domain, quantities of initially configured resources of all terminals in the scheduling domain, and RPLs of all terminals in the scheduling domain, to obtain a quantity of re-configured resources of the first terminal, the first terminal being a terminal in the scheduling domain, including:
obtaining resource usage statuses of all terminals in the scheduling domain, wherein the resource usage statuses each include a busy state where a quantity of allocated resources is less than an actual resource requirement of a terminal and an idle state where the quantity of allocated resources is greater than the actual resource requirement of the terminal;
determining, according to the resource usage statuses, the RPLs, and the quantities of initially configured resources of all terminals in the scheduling domain, a sum of smallest quantities of resources in the busy state required by all terminals in the scheduling domain;
determining a quantity of re-allocatable resources of all terminals in the scheduling domain according to the sum of the smallest quantities of resources in the busy state and the total quantity of available resources in the scheduling domain; and
determining the quantity of re-configured resources of the first terminal according to the quantity of re-allocatable resources of all terminals in the scheduling domain; and
allocating, by the resource scheduling server, one or more resources to the first terminal according to the quantity of re-configured resources of the first terminal.

2. The method according to claim 1, wherein the determining a quantity of re-allocatable resources of all terminals in the scheduling domain according to the sum of the smallest quantities of resources in the busy state and the total quantity of available resources in the scheduling domain comprises:
calculating a difference between the total quantity of available resources in the scheduling domain and the sum of the smallest quantities of resources in the busy state to obtain the quantity of re-allocatable resources of all terminals in the scheduling domain.

3. The method according to claim 1, wherein the determining the quantity of re-configured resources of the first terminal according to the quantity of re-allocatable resources of all terminals in the scheduling domain comprises:
determining whether the quantity of re-allocatable resources of all terminals in the scheduling domain is equal to 0;
upon determining the quantity of re-allocatable resources of all terminals in the scheduling domain is not equal to 0, determining that the quantity of re-configured resources of the first terminal is equal to a sum of the quantity of initially configured resources of the first terminal and a quantity of re-allocatable resources of the first terminal; and
upon determining the quantity of re-allocatable resources of all terminals in the scheduling domain is equal to 0, determining that the quantity of re-configured resources of the first terminal is equal to the quantity of initially configured resources of the first terminal.

4. The method according to claim 3, further comprising:
upon determining the quantity of re-allocatable resources of all terminals in the scheduling domain is greater than 0, determining a quantity of re-allocatable resources of the first terminal by performing resource scheduling and re-allocation on the quantity of re-allocatable resources of all terminals in the scheduling domain according to the resource usage statuses and the RPLs of all terminals in the scheduling domain; and
upon determining the quantity of re-allocatable resources of all terminals in the scheduling domain is less than 0, determining the quantity of re-allocatable resources of the first terminal by: dividing a particular quantity of resources from a first terminal set according to the resource usage statuses and the RPLs of all terminals in the scheduling domain, and re-allocating the particular quantity of resources to a second terminal set.

5. The method according to claim 4, wherein the method further comprises:
adding, by the resource scheduling server, a new terminal to the scheduling domain when the quantity of re-allocatable resources of all terminals in the scheduling domain is greater than 0 and some re-allocatable resources remain after the re-allocatable resources of all terminals in the scheduling domain are re-allocated according to the resource usage statuses and the RPLs of all terminals in the scheduling domain; and allocating, by the resource scheduling server, the re-allocatable resources to the new terminal.

6. The method according to claim 1, wherein the RPL comprises at least one of the following level information: exclusive resource occupation, resource sharing, resource quota, resource limit, and resource loan.

7. The resource scheduling method according to claim 1, the method further comprising:

dividing the all terminals in the scheduling domain into a first terminal set and a second terminal set according to the resource usage statuses and the RPLs;

removing a portion of resources from the first terminal set; and re-allocating the portion of resourced to the second terminal set.

8. The resource scheduling method according to claim 1, the method further comprising:

changing a second terminal from the busy state to the idle state, wherein the second terminal is a terminal of the all terminal in the scheduling domain other than the first terminal; and release resources from the second terminal to any other of the all terminals.

9. A resource scheduling server, comprising: a memory storing computer program instructions; and a processor coupled to the memory and, when executing the computer program instructions, configured to perform:

receiving a resource application request sent by a first terminal, the resource application request including a quantity of required resources of the first terminal and a resource priority level (RPL) requested by the first terminal;

determining a quantity of initially configured resources of the first terminal according to the quantity of required resources;

performing resource scheduling and re-allocation according to a total quantity of available resources in a scheduling domain, quantities of initially configured resources of all terminals in the scheduling domain, and RPLs of all terminals in the scheduling domain, to obtain a quantity of re-configured resources of the first terminal, the first terminal being a terminal in the scheduling domain, including:

obtaining resource usage statuses of all terminals in the scheduling domain, wherein the resource usage statuses each include a busy state where a quantity of allocated resources is less than an actual resource requirement of a terminal and an idle state where the quantity of allocated resources is greater than the actual resource requirement of the terminal;

determining, according to the resource usage statuses, the RPLs, and the quantities of initially configured resources of all terminals in the scheduling domain, a sum of smallest quantities of resources in the busy state required by all terminals in the scheduling domain;

determining a quantity of re-allocatable resources of all terminals in the scheduling domain according to the sum of the smallest quantities of resources in the busy state and the total quantity of available resources in the scheduling domain; and determining the quantity of re-configured resources of the first terminal according to the quantity of re-allocatable resources of all terminals in the scheduling domain; and allocating one or more resources to the first terminal according to the quantity of re-configured resources of the first terminal.

10. The resource scheduling server according to claim 9, wherein the determining a quantity of re-allocatable resources of all terminals in the scheduling domain according to the sum of the smallest quantities of resources in the busy state and the total quantity of available resources in the scheduling domain comprises:

calculating a difference between the total quantity of available resources in the scheduling domain and the sum of the smallest quantities of resources in the busy state to obtain the quantity of re-allocatable resources of all terminals in the scheduling domain.

11. The resource scheduling server according to claim 9, wherein the determining the quantity of re-configured resources of the first terminal according to the quantity of re-allocatable resources of all terminals in the scheduling domain comprises:

determining whether the quantity of re-allocatable resources of all terminals in the scheduling domain is equal to 0;

upon determining the quantity of re-allocatable resources of all terminals in the scheduling domain is not equal to 0, determining the quantity of re-configured resources of the first terminal is equal to a sum of the quantity of initially configured resources of the first terminal and a quantity of re-allocatable resources of the first terminal; and upon determining the quantity of re-allocatable resources of all terminals in the scheduling domain is equal to 0, determining that the quantity of re-configured resources of the first terminal is equal to the quantity of initially configured resources of the first terminal.

12. The resource scheduling server according to claim 11, further comprising:

upon determining the quantity of re-allocatable resources of all terminals in the scheduling domain is greater than 0, determining a quantity of re-allocatable resources of the first terminal by performing resource scheduling and re-allocation on the quantity of re-allocatable resources of all terminals in the scheduling domain according to the resource usage statuses and the RPLs of all terminals in the scheduling domain; and upon determining the quantity of re-allocatable resources of all terminals in the scheduling domain is less than 0, determining the quantity of re-allocatable resources of the first terminal by: dividing a particular quantity of resources from a first terminal set according to the resource usage statuses and the RPLs of all terminals in the scheduling domain, and re-allocating the particular quantity of resources to a second terminal set.

13. The resource scheduling server according to claim 12, wherein the processor is further configured to perform:

adding a new terminal to the scheduling domain when the quantity of re-allocatable resources of all terminals in the scheduling domain is greater than 0 and some re-allocatable resources remain after the re-allocatable resources of all terminals in the scheduling domain are re-allocated according to the resource usage statuses and the RPLs of all terminals in the scheduling domain; and allocating the re-allocatable resources to the new terminal.

14. The resource scheduling server according to claim 9, wherein the RPL comprises at least one of the following level information: exclusive resource occupation, resource sharing, resource quota, resource limit, and resource loan.

15. The resource scheduling server according to claim 9, wherein the processor is further configured to perform:
dividing the all terminals in the scheduling domain into a first terminal set and a second terminal set according to the resource usage statuses and the RPLs;
removing a portion of resources from the first terminal set; and
re-allocating the portion of resourced to the second terminal set.

16. The resource scheduling server according to claim 9, wherein the processor is further configured to perform:
changing a second terminal from the busy state to the idle state, wherein the second terminal is a terminal of the all terminal in the scheduling domain other than the first terminal; and
release resources from the second terminal to any other of the all terminals.

17. A non-transitory computer-readable storage medium storing computer program instructions executable by at least one processor to perform:
receiving a resource application request sent by a first terminal, the resource application request including a quantity of required resources of the first terminal and a resource priority level (RPL) requested by the first terminal;
determining a quantity of initially configured resources of the first terminal according to the quantity of required resources;
performing resource scheduling and re-allocation according to a total quantity of available resources in a scheduling domain, quantities of initially configured resources of all terminals in the scheduling domain, and RPLs of all terminals in the scheduling domain, to obtain a quantity of re-configured resources of the first terminal, the first terminal being a terminal in the scheduling domain, including:
obtaining resource usage statuses of all terminals in the scheduling domain, wherein the resource usage statuses each include a busy state where a quantity of allocated resources is less than an actual resource requirement of a terminal and an idle state where the quantity of allocated resources is greater than the actual resource requirement of the terminal;
determining, according to the resource usage statuses, the RPLs, and the quantities of initially configured resources of all terminals in the scheduling domain, a sum of smallest quantities of resources in the busy state required by all terminals in the scheduling domain;
determining a quantity of re-allocatable resources of all terminals in the scheduling domain according to the sum of the smallest quantities of resources in the busy state and the total quantity of available resources in the scheduling domain; and
determining the quantity of re-configured resources of the first terminal according to the quantity of re-allocatable resources of all terminals in the scheduling domain; and
allocating one or more resources to the first terminal according to the quantity of re-configured resources of the first terminal.

18. The non-transitory computer-readable storage medium according to claim 17, wherein the determining a quantity of re-allocatable resources of all terminals in the scheduling domain according to the sum of the smallest quantities of resources in the busy state and the total quantity of available resources in the scheduling domain comprises:
calculating a difference between the total quantity of available resources in the scheduling domain and the sum of the smallest quantities of resources in the busy state to obtain the quantity of re-allocatable resources of all terminals in the scheduling domain.

19. The non-transitory computer-readable storage medium according to claim 17, wherein the determining the quantity of re-configured resources of the first terminal according to the quantity of re-allocatable resources of all terminals in the scheduling domain comprises:
determining whether the quantity of re-allocatable resources of all terminals in the scheduling domain is equal to 0;
upon determining the quantity of re-allocatable resources of all terminals in the scheduling domain is not equal to 0, determining that the quantity of re-configured resources of the first terminal is equal to a sum of the quantity of initially configured resources of the first terminal and a quantity of re-allocatable resources of the first terminal; and
upon determining the quantity of re-allocatable resources of all terminals in the scheduling domain is equal to 0, determining that the quantity of re-configured resources of the first terminal is equal to the quantity of initially configured resources of the first terminal.

20. The non-transitory computer-readable storage medium according to claim 17, wherein the computer program instructions are further executable by the at least one processor to perform:
dividing the all terminals in the scheduling domain into a first terminal set and a second terminal set according to the resource usage statuses and the RPLs;
removing a portion of resources from the first terminal set; and
re-allocating the portion of resourced to the second terminal set.

* * * * *